Dec. 22, 1959

W. H. ROSENBLUM ET AL 2,918,287

MECHANICAL PUZZLE, WHICH, WHEN PROPERLY ASSEMBLED ESTABLISHES RADIO RECEIVER

Filed Feb. 4, 1955

INVENTORS
William H. Rosenblum, and
Max Mirkin
BY
Howard P. Kinos
ATTORNEY

Dec. 22, 1959
W. H. ROSENBLUM ET AL
2,918,287
MECHANICAL PUZZLE, WHICH, WHEN PROPERLY
ASSEMBLED ESTABLISHES RADIO RECEIVER
Filed Feb. 4, 1955
2 Sheets-Sheet 2
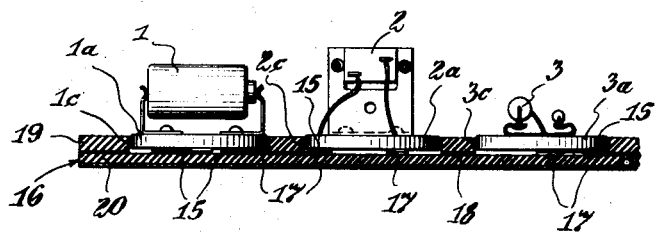
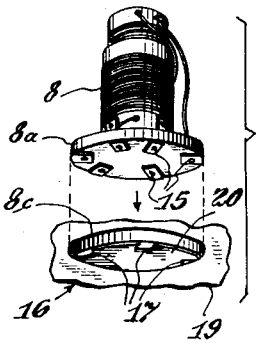
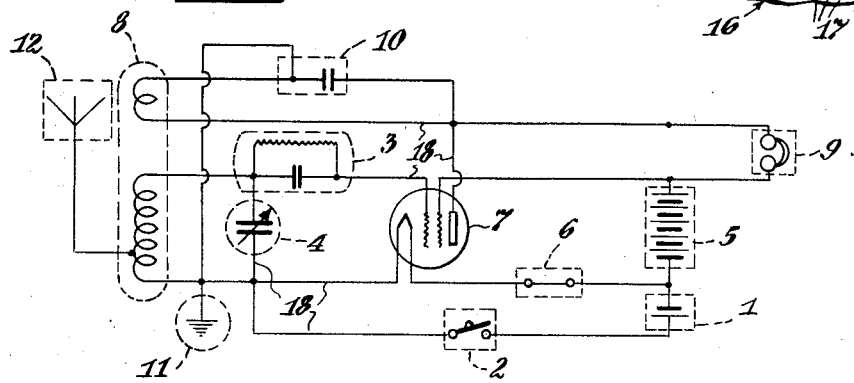
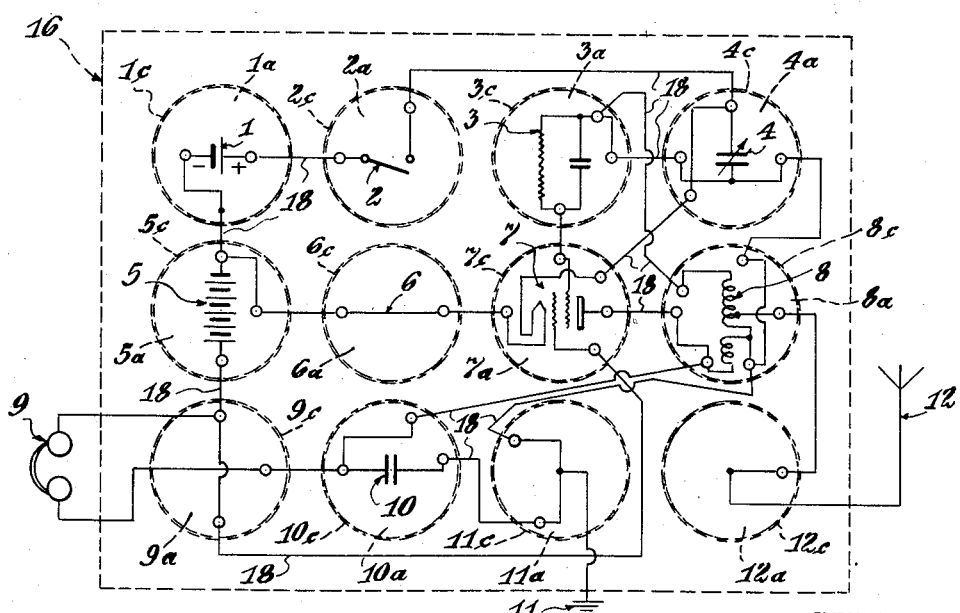
INVENTORS
William H. Rosenblum and
BY    Max Mirkin
Howard R. King
ATTORNEY

United States Patent Office 2,918,287
Patented Dec. 22, 1959

2,918,287

MECHANICAL PUZZLE, WHICH WHEN PROPERLY ASSEMBLED ESTABLISHES RADIO RECEIVER

William H. Rosenblum, Brooklyn, and Max Mirkin, Bronx, N.Y.

Application February 4, 1955, Serial No. 486,077

2 Claims. (Cl. 273—156)

This invention relates to puzzles, and more particularly to puzzles having movable pieces which have to be properly placed to solve the puzzle.

A primary object of the invention is to provide a puzzle which, when solved, has a utility.

Also, the invention proposes a puzzle having educational value.

More specifically, the invention provides a puzzle, which, when solved, constitutes a radio set and proof of proper solution of the puzzle is established by the radio operating.

Other objects, advantages and novel features of construction will appear to persons skilled in the art to which the invention appertains, as the description proceeds, both by direct recitation thereof and by implication from the context.

Referring to the accompanying drawings, in which like numerals of reference indicate similar parts throughout the several views:

Figure 3 is a sectional view on line III—III of Fig. 1;

Figure 4 is a perspective view of a portion of the basal member and of the movable piece which belongs in the pocket of the basal member shown below said piece;

Figure 5 is a diagrammatic view of the radio circuit arbitrarily employed in the present showing; and Figure 6 shows the circuit as applied to the solved puzzle.

Figure 1:
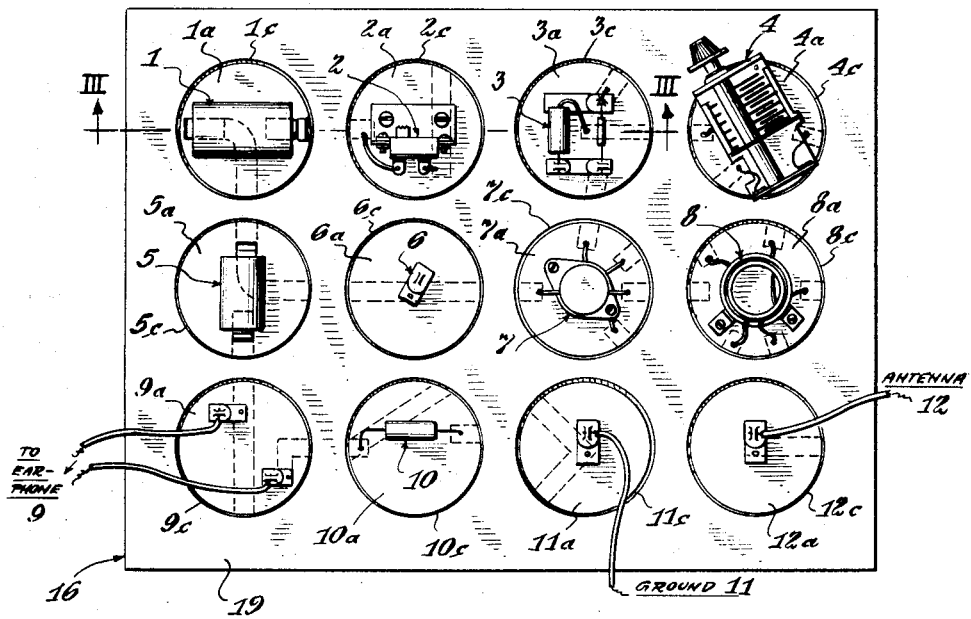
Figure 1 is a plan of the puzzle in its solved condition, with the movable pieces all in place.

In the specific embodiment of the invention illustrated in said drawings, a radio receiver circuit has been arbitrarily selected which has eleven essential instrumentalities for constituting the complete circuit, and one dummy that is not required for the circuit but is provided to add to the complexity of solution. For purpose of identification, the several instrumentalities shown are an A-battery 1, switch 2, grid leak 3, variable condenser 4, B-battery 5, dummy 6, electron tube 7, transformer 8, sound producer, such as ear-phones 9, capacitance 10, ground connector 11, and aerial connector 12. These several instrumentalities are standard radio elements and are arranged in proper relation in a standard radio-receiving circuit, such as shown in Figure 5 by way of example.

Each of said instrumentalites or radio elements is secured upon the top side of a movable piece individual thereto and separately designated by reference numerals corresponding to the instrumentality thereon but with the letter "a" added to the numeral. These several movable pieces are composed of electrically insulative material. On the under side of each of said movable pieces are mounted electrically conductive contact shoes 15, each occupying only a small part of the underface of the movable piece on which it is mounted. There are as many of said shoes on each movable piece as required for making electrical connections to the terminals of the particular instrumentality carried on each of said pieces. Each terminal of each instrumentality is connected to a separate one of said shoes.

A basal member 16 is provided to receive all of said movable pieces and retain the same in the position in which the user places them. As here shown, said basal member has a plurality of upwardly open pockets, one for each of said movable pieces, and here identified by the same numeral identifying the particular pieces, but with the letter "c" added thereafter instead of "a." It is now appropriate to mention that each piece is properly shaped and dimensioned to fit its intended pocket, and each pocket and its fitting piece may have any desired contour shape. However, it will add to the complexity of the puzzle to have all of said pockets and pieces of the same shape and dimensions, so the person solving the puzzle cannot be guided by differences in size or shape and thus may rightly or wrongly place any one of the movable pieces in any one of said pockets. Difficulty of solution of the puzzle is further increased by utilizing circular or disc-shaped movable pieces and correspondingly circular pockets thereby necessitating that the user shall also be required to position each at the rotative proper angularity.

In the bottom of each pocket are contact fingers 17 which are appropriately located to directly underlie and be engaged by the contact shoes of the proper movable piece for that pocket and with the said piece rotated to its proper angular position in said pocket. The contact fingers are interconnected by conductors 18 in correct manner to complete the radio circuits with the correctly placed movable pieces. Dissimilitude of location of the contact fingers in different pockets makes completion of the circuit impossible unless the pieces are properly placed.

Figure 2:
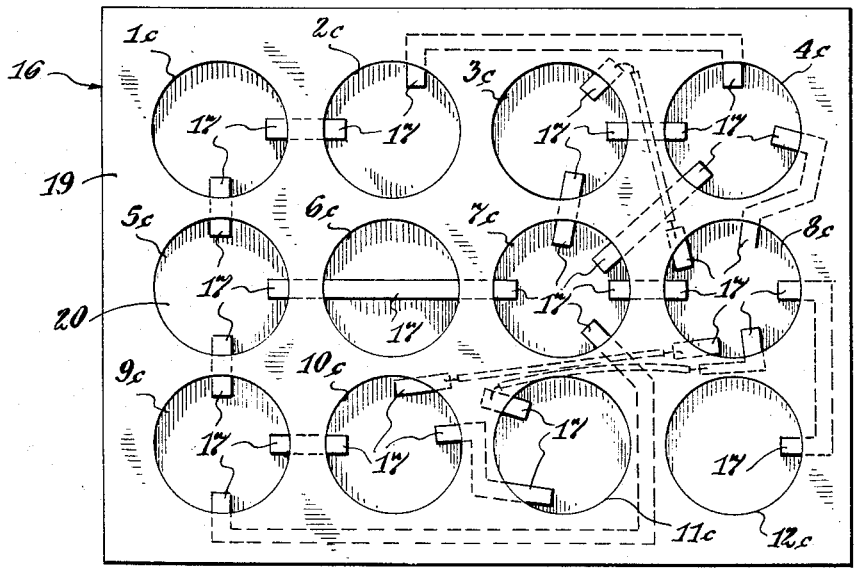
Figure 2 is a plan of the basal member of the puzzle, with none of the movable pieces in place.

Elaborating somewhat upon the foregoing description, it may be added that one conveniently constructed embodiment of basal member 16 is shown in Figures 2 and 3 most clearly, as laminated. It has an upper ply 19 in which holes are made to form the hollows and side walls of said pockets. A bottom ply 20 which has no holes is cemented or otherwise secured to the under face of the upper ply and thereby closes the bottoms of all of said holes thereby also completing the pockets by providing them with bottoms. This laminated construction makes it convenient to hold the contact fingers between said plies with ends of said fingers protruding into the pockets on the bottoms thereof. Furthermore, the conductors 18 may lie between and be held by said plies. In most instances, conductors from one finger to another may be integral with both, and in practice stampings are made from sheet copper that will lie flatwise between the plies and with opposite ends of the stamping constituting the fingers that protrude into the pockets. It is preferable that the contact shoes 15 be resilient and divergent from the under face of the movable pieces so as to assure contact with the contact fingers 17 when juxtaposed thereon as the puzzle is solved. In those instances where conductors have to cross, insulated wire may used for the one crossing.

We claim:

1. A puzzle comprising a basal member having a selected number of confining means for receiving and rotatably guiding movable pieces at fixed locations on said member, movable pieces at least equalling in number the selected number of confining means for applying to said basal member and fitting in said confining means and having unrestricted rotation for full 360° in said confining means, said movable pieces for the portions thereof receivable in said confining means being of equal size and each susceptible to different rotative positioning while located in said confining means, said movable pieces and confining means having cooperating electrical contact members differing in location for different movable pieces and different confining means, and only one movable piece and a corresponding confining means being proper for and completing electrical connection of said contact members, said contact members in their entirety being completely hidden from view when the movable pieces are applied in said confining means for preventing visual ascertainment of propriety of the particular movable piece for the particular confining means or propriety of rotative location thereof in said confining means, said movable pieces having radio instrumentalities in conjunction therewith requiring choice of a proper one of said pieces for placement in each of said confining means and proper rotative relation thereof to each said fixed location for rightful placement of each of said pieces at its respective location in the rightly chosen said confining means as a solution of said puzzle, and means for completing a radio-receiver circuit with said pieces properly related and placed each at its rightful location on said member in said confining means therefor and each rotated in said confining means to proper rotated position in its proper confining means.

2. A puzzle in accordance with claim 1, wherein said contact members of each movable piece comprises contact shoes thereon in a common plane and connected with the instrumentality individual to that movable piece, and the contact members of each confining means of said basal member comprise contact fingers in a common plane at the bottom of each of said confining means and interconnected with said radio circuit, said contact shoes being movable by rotation of said movable pieces in said confining means by rotation of said movable piece thereby rotating said contact shoes into and out of contacting engagement with successive ones of said contact fingers for completing said radio-receiver circuit when proper contacts are engaging to include said instrumentalities therein with said movable pieces properly selected and placed in their respective confining means and rotated to engagement of proper shoes to proper fingers.

References Cited in the file of this patent

UNITED STATES PATENTS

| | | |
|---|---|---|
| 2,416,959 | Segal | Mar. 4, 1947 |
| 2,526,834 | Traugott et al. | Oct. 24, 1950 |
| 2,585,419 | Zarlengo | Feb. 12, 1952 |
| 2,593,479 | Nieter | Apr. 22, 1952 |
| 2,598,534 | Gordon | May 27, 1952 |
| 2,613,252 | Hiebel | Oct. 7, 1952 |
| 2,617,654 | Nolan et al. | Nov. 11, 1952 |
| 2,665,340 | Hammerstrand | Jan. 5, 1954 |
| 2,769,119 | Martin et al. | Oct. 30, 1956 |
| 2,776,415 | McGinley | Jan. 1, 1957 |
| 2,793,351 | Heath | May 21, 1957 |